INVENTOR.
ANTHONY T. ZAPPIA
BY
Hood, Gust & Irish
Attorney

March 30, 1965  A. T. ZAPPIA  3,175,895
BOTTOM PLATE SLIDE ASSEMBLY FOR HOLLOW WARE GLASS MACHINE
Filed Nov. 14, 1961  2 Sheets-Sheet 2

INVENTOR.
ANTHONY T. ZAPPIA
BY
Hood, Gust & Irish
Attorney 3,175,895
BOTTOM PLATE SLIDE ASSEMBLY FOR HOLLOW WARE GLASS MACHINE
Anthony T. Zappia, Indianapolis, Ind., assignor, by mesne assignments, to Speedway Machine & Tool Company, Inc., Indianapolis, Ind., a corporation of Indiana
Filed Nov. 14, 1961, Ser. No. 152,286
1 Claim. (Cl. 65—263)

The present invention relates to an improved bottom plate slide assembly for hollow ware glass forming machines, and the primary object of the invention is to provide such an assembly including means for closing the open bottom of a blow mold, for evacuating the closed mold during final formation of a piece from a parison and to cool the bottom plate and, to some extent, the forming mold.

A further object of the invention is to provide an assembly of the character described which may be adaptable for use with various sizes and shapes of blow molds in a given machine. A still further object of the invention is to provide such an assembly which is flexible in use in order to satisfy desired conditions of operation.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Figures 1, 2:
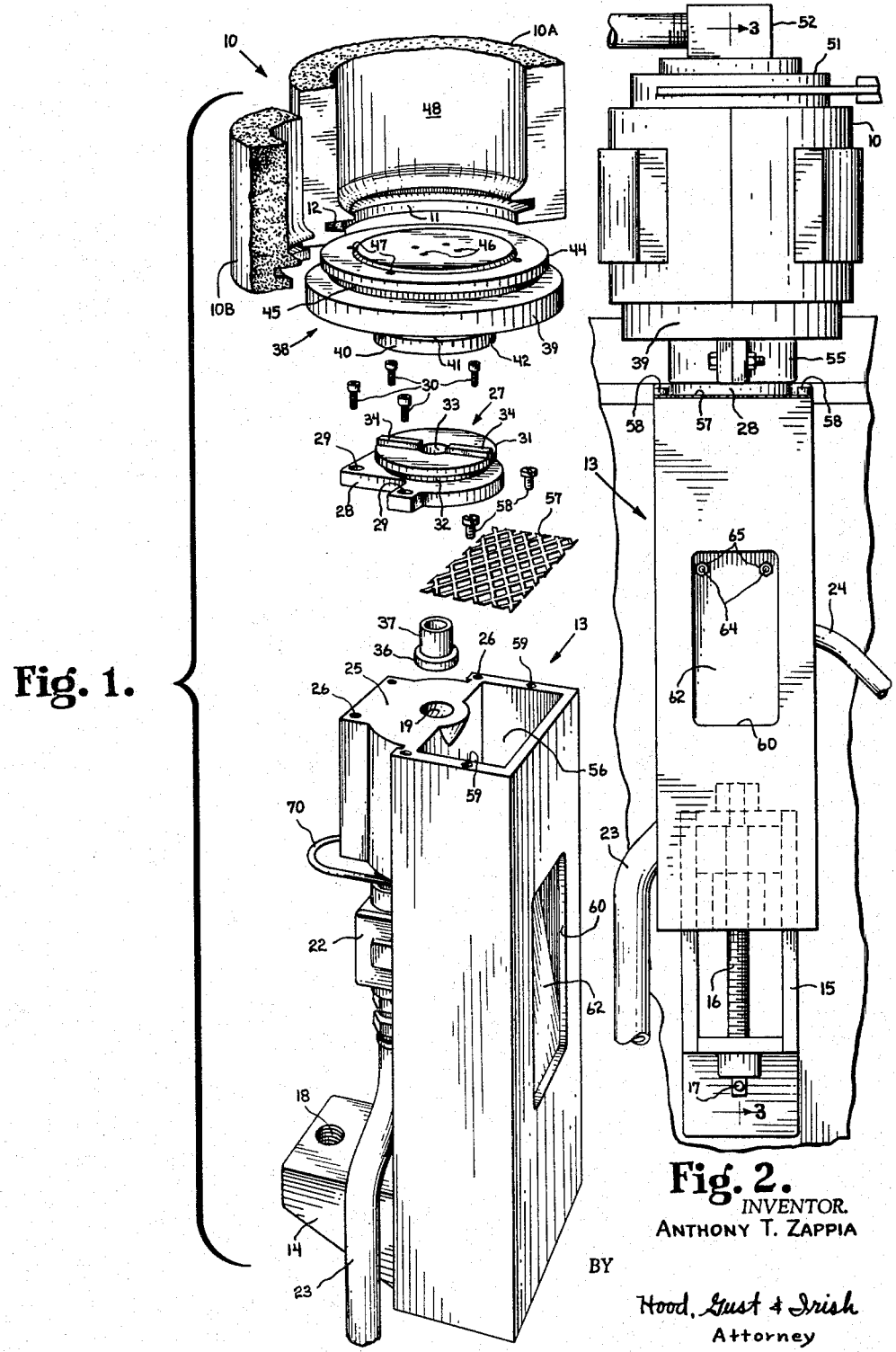
FIG. 1 is a perspective, exploded view of an assembly constructed in accordance with the present invention, showing a fragment of a blow mold in association therewith.
FIG. 2 is a rear elevation of my bottom plate assembly shown in closing relation to a blow mold.

Referring more particularly to the drawings, it will be seen that I have illustrated, somewhat diagrammatically, a fragment of a conventional blow mold indicated generally by the reference numeral 10 and comprising separable segments 10A and 10B. The mold is formed with an open bottom 11 which is preferably surrounded by an inwardly opening, annular groove 12.

The bottom plate assembly of the present invention comprises a housing or base indicated generally by the reference numeral 13 and having a forwardly projecting tongue 14 which is adapted to be guidedly mounted in bracket means 15 supported from a glass forming machine. In the illustrated embodiment of the invention, a screw shaft 16 is journalled in said bracket means upon a vertical axis and is held against axial movement relative to the bracket means. A manipulating handle 17 is carried by the screw 16 and said screw threadedly penetrates a bore 18 in the tongue 14 whereby rotation of the screw in one direction or the other will shift the housing 13, and its associated parts, vertically in one direction or the other.

The housing 13 is formed to provide a passage 19 adapted, at its lower end, telescopically to receive a tube 20 which may be secured in adjusted position in said passage by suitable means such as a set screw 21. To the tube 20 is operatively connected a conventional valve means 22 from which a flexible conduit 23 leads to a source of vacuum (not shown). Suitable means for actuating the valve 22 is indicated at 24 and may preferably comprise a flexible conduit leading to a source of fluid under pressure.

At its upper end, the housing 13 is formed to provide a planar table 25 in which are formed tapped sockets 26. An adapter plate, indicated generally by the reference numeral 27, comprises a block 28 formed with perforations 29 arranged for registry with the sockets 26 and to pass a plurality of screws 30 receivable in said sockets to retain said adapter plate solidly in engagement with the surface 25. The block 28 is provided with a reduced, upstanding platform 31 which is perimetrally undercut at 32, as is most clearly illustrated in FIGS. 1 and 3. Said adapter plate is formed with a bore or passage 33 therethrough which, when said adapter plate is secured in place on the surface 25 of the housing 13, registers with the upper, open mouth of the passage 19. Diametrically-extending rib means 34 is provided on the top surface of the platform 31 for a reason which will become apparent.

The lower end of the passage 33 is somewhat enlarged as at 35 for the accommodation of the base flange 36 of a bushing 37. As is clearly illustrated in FIG. 3, the diameter of the flange 36 is somewhat less than the diameter of the enlargement 35, and the diameter of the shank of the bushing 37 is somewhat less than the diameter of the bore or passage 33 so that the bushing is free for slight transaxial movement in any direction relative to the adapter plate 27. The length of the bushing 37 is such that, when the parts are in assembled relationship as shown, the upper end of the bushing shank is substantially flush with the upper surface of the rib means 34.

A bottom plate is indicated generally by the reference numeral 38 and comprises a discoid base 39 provided with a reduced, depending platform 40 which is perimetrally undercut as at 41. The exposed, lowermost surface of the platform 40 is provided with a diametrically extending groove 42 proportioned and designed snugly to receive the rib means 34 when the platform 40 is in intimate, face-to-face engagement with the platform 31.

The lowermost portion of the plate 38 is formed with an axially-extending cavity 43 opening through the lower face of the platform 40 and disposed, when the parts are in assembled relation, in registry with the passage 33 and snugly, telescopically to receive the upper end of the bushing 37.

The bottom plate 38 is further formed with a reduced, upstanding platform 44 perimetrally undercut as at 45, the parts being so proportioned and designed that, when the mold 10 is closed upon the bottom plate 38, the undercut rim of the platform 44 will be snugly and sealingly engaged within the annular groove 12, effectively to close the bottom of the mold.

A plurality of minute bores 46 radiate from the upper portion of the cavity 43 to open, at a plurality of spaced points, through the uppermost surface of the bottom plate 38; and a further plurality of similar bores 47 similarly radiate from the cavity 43 to open through the top of the platform 44 near its periphery. In accordance with conventional practice, the sections of the mold 10, when closed, define a mold chamber 48 within which is adapted to be suspended a parison 49. The finish 50 of the article to be produced has already been formed, and the parison is supported from its finish by a neck ring 51 in accordance with conventional practice. A blow head 52 is then associated with the above-described parts to supply air under pressure to the interior of the parison for the purpose of expanding the parison into conformity with the interior of the chamber 48.

Obviously, as the parison is so expanded, air entrapped within the chamber 48 and outside of the parison will be compressed and will interfere with proper formation of the finished article, unless it can escape from the chamber. Thus, it is desirable, not only to ensure true conformity of the article but also to accelerate the rate at which the glass may be blown, to exhaust the entrapped air from the chamber 48. By opening the valve 22 to a source of vacuum, such exhaustion can be accomplished. Preferably, a peripherally-narrow relief is provided, as at 53, within the mold and extending to the neck of the mold, such relief channel communicating with a further minute bore 54 leading to the cavity 43.

Figure 3:
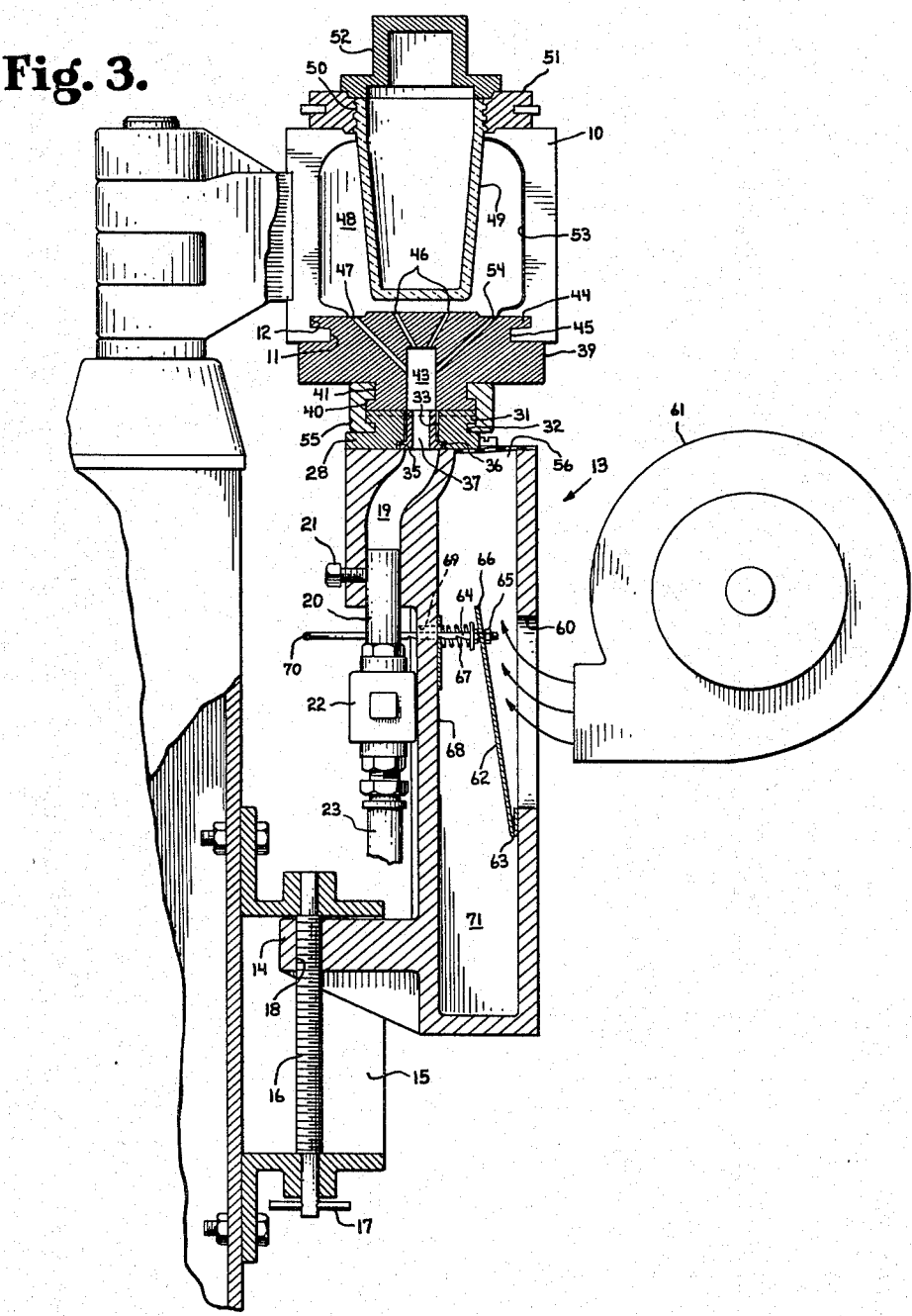
FIG. 3 is a vertical section thereof.

The bottom plate 38 is most advantageously secured in place in the assembly by means of a clamp 55 constructed and arranged to span the platforms 31 and 40 and to engage in the undercuts 32 and 41, as most clearly shown in FIG. 3. Preferably, the clamp means 55 will be so proportioned as to permit some slight transaxial adjustment of the bottom plate 38 with respect to the adapter plate 28 to compensate for slight misalignment of the bottom plate assembly with respect to the mold 10; and the floating bushing 37 contributes, of course, to this capacity.

It is desirable to cool the bottom plate 38; and I propose to accomplish that result by means of the structure now to be described. The base or housing 13 is formed to provide a chamber 71 having a mouth 56 which opens through the upper end of the housing. A screen 57 preferably overlies the chamber mouth, being secured in place by means of screws 58 penetrating the screen and taking into tapped sockets 59 in the upper end of the housing.

The rear wall of the housing 13 is formed with a port 60 opening into the chamber 71, and a fan 61, or other equivalent blower means, is conveniently arranged to deliver a flow of cooling air or other gas to the port 60. Of course, it is undesirable to lower the temperature of the plate 38 too far, and therefore I provide a valve 62 dominating the port 60 and movable to vary the effective flow area of said port, thereby controlling the amount of air which will be delivered, at any moment, through the chamber mouth 56 to surround and flow upwardly past the bottom plate 38. As shown, the valve means comprises a plate whose lower edge is hinged as at 63 near the lower edge of the port 60. Plunger means 64 has operative engagement as at 65 with the upper edge 66 of the plate 62 and a spring 67 is sleeved on said plunger means and is confined between the valve plate 62 and the front wall 68 (or other abutment means) within the chamber 71. The plunger means 64 is guided within an opening 69 in the chamber wall and extends to the exterior of the chamber where it is accessible, as at 70, for manual manipulation. The spring 67, of course, yieldably biases the valve 62 toward closing association with the port 60, but the effect of said spring may be overcome by manipulation of the plunger means 64–70 to set the valve element 62 in any desired relation to the port 60. Preferably, the plunger means will be notched at intervals, as shown, for coaction with the chamber wall 68 to retain the valve 62 in any one of a plurality of settings relative to said port.

I claim as my invention:

For use with a blow mold in a glass forming machine, said mold having an open bottom mold cavity, a bottom plate assembly comprising a housing, means for supporting said assembly on such a machine in cooperative association with such mold, said housing being formed to provide a chamber and to provide a passage wholly out of communication with said chamber, said chamber and passage both opening through the upper end of said housing, a bottom plate supported from the upper end of said housing and shaped for engagement by such a mold, when closed, to close the open bottom of such mold cavity, said plate being formed with passage means therethrough providing communication, when so engaged, between said housing passage and the interior of such cavity outside a parison suspended in such mold cavity, means for selectively connecting said housing passage with a source of vacuum, said housing further being provided with a valve-controlled port opening into said chamber, and fan means arranged to deliver a flow of cooling gas to said port, the open upper end of said chamber being arranged to direct such gas upwardly to flow exteriorly around and past such blow mold.

References Cited by the Examiner

UNITED STATES PATENTS

| 1,741,708 | 12/29 | Milliken | 65—266 |
| 2,402,475 | 6/46 | Waterburg et al. | 65—355 |
| 2,702,444 | 2/55 | Rowe | 65—355 |

FOREIGN PATENTS 331,686 11/35 Italy.

DONALL H. SYLVESTER, *Primary Examiner*.